(12) United States Patent
Xiao et al.

(10) Patent No.: US 8,712,096 B2
(45) Date of Patent: Apr. 29, 2014

(54) METHOD AND APPARATUS FOR DETECTING AND TRACKING VEHICLES

(75) Inventors: Jiangjian Xiao, Ningbo (CN); Harpreet Singh Sawhney, West Windsor, NJ (US); Hui Cheng, Bridgewater, NJ (US)

(73) Assignee: SRI International, Menlo Park, CA (US)

( * ) Notice: Subject to any disclaimer, the term of this patent is extended or adjusted under 35 U.S.C. 154(b) by 329 days.

(21) Appl. No.: 13/041,092

(22) Filed: Mar. 4, 2011

(65) Prior Publication Data
US 2012/0070034 A1 Mar. 22, 2012

Related U.S. Application Data

(60) Provisional application No. 61/311,053, filed on Mar. 5, 2010.

(51) Int. Cl.
*G06K 9/00* (2006.01)

(52) U.S. Cl.
USPC .......................................................... 382/103

(58) Field of Classification Search
None
See application file for complete search history.

(56) References Cited

U.S. PATENT DOCUMENTS

| | | | | |
|---|---|---|---|---|
| 5,963,653 A * | 10/1999 | McNary et al. | ............... | 382/103 |
| 6,763,148 B1 * | 7/2004 | Sternberg et al. | ............ | 382/293 |
| 7,630,802 B2 * | 12/2009 | Breed | .......................... | 701/31.6 |
| 7,899,114 B2 * | 3/2011 | Kostrzewski et al. | ... | 375/240.01 |
| 8,024,084 B2 * | 9/2011 | Breed | .......................... | 701/31.4 |
| 8,554,710 B2 * | 10/2013 | Neely et al. | ..................... | 706/45 |
| 2008/0162389 A1 * | 7/2008 | Aboutalib | ....................... | 706/15 |
| 2009/0164213 A1 * | 6/2009 | Lennington et al. | .......... | 704/231 |
| 2010/0279439 A1 * | 11/2010 | Shah et al. | ....................... | 438/15 |
| 2011/0280447 A1 * | 11/2011 | Conwell | ....................... | 382/103 |

OTHER PUBLICATIONS

Ali, S., et al., "Motion and Appearance Contexts for Tracking and Re-Acquiring Targets in Aerial Videos," *CVPR*, 2007.
Jones, S., et al., "Traffic Simulation Software Comparison Study," *Report of University Transportation Center for Alabama*, 2004.
Kang, J., et al., "Detection and Tracking of Moving Objects from a Moving Platform in Presence of Strong Parallax," *IEEE International Conference on Computer Vision*, Oct. 2005, Beijing, China.
Kasturi, R., et al., "Framework for Performance Evaluation of Face, Text, and Vehicle Detection and Tracking in Video: Data, Metrics, and Protocol," *IEEE Transactions on Pattern Analysis and Machine Intelligence*, Feb. 2009, pp. 319-336, vol. 31, No. 2.
Leininger, B., "A Next-Generation System Enables persistent Surveillance of Wide Areas," *SPIE Newsroom*, Apr. 2008.
Pellechia, M., et al., "Real-Time Airborne Data Management System," *SPIE Airborne ISR Systems and Applications VI*, Apr. 2009.
Perera, A., et al., "Multi-Object Tracking Through Simultaneous Long Occlusions and Split-Merge Conditions," *CVPR*, 2006.

(Continued)

*Primary Examiner* — Nancy Bitar

(57) ABSTRACT

The present invention relates to a method and apparatus for detecting and tracking vehicles. One embodiment of a system for detecting and tracking an object (e.g., vehicle) in a field of view includes a moving object indication stage for detecting a candidate object in a series of input video frames depicting the field of view and a track association stage that uses a joint probabilistic graph matching framework to associate an existing track with the candidate object.

19 Claims, 5 Drawing Sheets

(56) References Cited

OTHER PUBLICATIONS

Reynolds, W., et al., "A Scalable Video Stabilization Algorithm for Multi-Camera Systems," *IEEE Conference on Advanced Video and Signal Based Surveillance*, Sep. 2009.

Xiao, J., et al., "Geo-Spatial Aerial Video Processing for Scene Understanding and Object Tracking," *CVPR*, 2008.

Yilmaz, A., et al., "Object Tracking: A Survey," *ACM Journal of Computing Surveys*, Dec. 2006, pp. 1-45, vol. 38, No. 4, article 13.

Yu, Q., et al., "Motion Pattern Interpretation and Detection for Tracking Moving Vehicles in Airborne Videos," *CVPR*, 2009.

Cour, T., et al., "Balanced Graph Matching," *NIPS*, 2006.

Cox, I., et al., "An Efficient Implementation of Reid's Multiple Hypothesis Tracking Algorithm and its Evaluation for the purpose of Visual Tracking,".

Sinkhorn, R., et al., "Concerning Nonnegative Matrices and Doubly Stochastic Matrices," *Pacific Journal of Mathematics*, 1967, vol. 21, No. 2, pp. 343-348.

Xiao, J., et al., "Vehicle and Person Tracking in UAV Videos," *Classification of Events, Activities, and Relationships Evaluation and Workshop*, 2007.

Zass, R., et al., "Probabilistic Graph and Hypergraph Matching," *CVPR*, 2008.

\* cited by examiner

METHOD AND APPARATUS FOR DETECTING AND TRACKING VEHICLES

CROSS REFERENCE TO RELATED APPLICATIONS

This application claims the benefit of U.S. Provisional Patent Application Ser. No. 61/311,053, filed Mar. 5, 2010, which is herein incorporated by reference in its entirety.

REFERENCE TO GOVERNMENT FUNDING

This invention was made with Government support under Contract No. N00014-08-C-0039, awarded by the Office of Naval Research. The Government has certain rights in this invention.

FIELD OF THE INVENTION

The present invention relates generally to surveillance applications, and relates more particularly to the aerial video surveillance of vehicles.

BACKGROUND OF THE DISCLOSURE

Persistent aerial video surveillance using a wide field-of-view sensor system provides new opportunities and challenges to simultaneously monitor vehicle activities and traffic behavior in a city-size region. For instance, the low frame rate (e.g., 1-2 Hz), low spatial resolution (e.g., with ground sampling distance of about 50 cm/pixel), and sheer number of moving objects (e.g., thousands of vehicles in a single frame) make tracking and detection using wide field-of-view aerial data challenging. Moreover, the traffic models used in conventional tracking applications are primarily kinematic-constraint driven applications with strong appearance cues, and do not exploit information about road structure, derivable traffic behavior, or vehicle interaction dynamics (e.g., collision constraints). Such applications therefore tend to lose tracked vehicles in dense traffic urban environments.

SUMMARY OF THE INVENTION

The present invention relates to a method and apparatus for detecting and tracking vehicles. One embodiment of a system for detecting and tracking an object (e.g., vehicle) in a field of view includes a moving object indication stage for detecting a candidate object in a series of input video frames depicting the field of view and a track association stage that uses a joint probabilistic graph matching framework to associate an existing track with the candidate object.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention relates to a method and apparatus for detecting and tracking vehicles. Embodiments of the invention use a probabilistic relation graph framework to bridge vehicle behavior models with a tracking technique that detects and tracks vehicles over long periods of time in wide field-of-view aerial videos and under dense traffic scenarios. Further embodiments of the invention rely on road network information in order to exploit inherent traffic patterns in a monitored environment.

Within the context of the present invention, a "object" refers to a vehicle whose movement is or will potentially be monitored. A "track" refers to an object's monitored trajectory, including stops.

Figure 1:
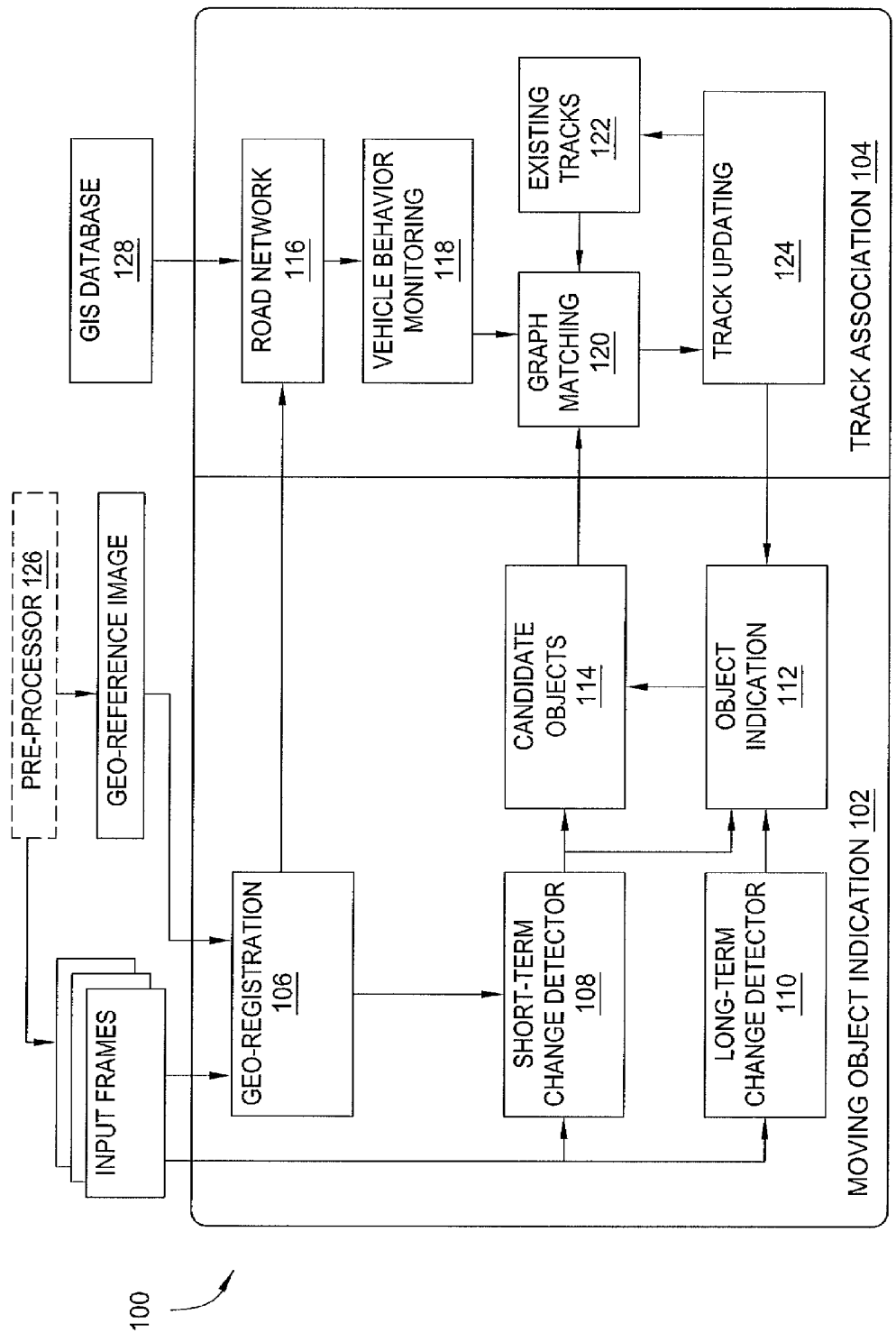
FIG. 1 is a schematic diagram illustrating one embodiment of a vehicle detection and tracking system, according to the present invention.

FIG. 1 is a schematic diagram illustrating one embodiment of a vehicle detection and tracking system 100, according to the present invention. As illustrated, the system 100 generally comprises two stages: a moving object indication stage 102 and a track association stage 104. The moving object indication stage 102 and the track association stage 104 cooperate to detect and track moving vehicles.

The moving object indication stage 102 detects and tracks vehicles within the field of view of a wide field-of-view aerial sensor system. Thus, in essence, the goal of the moving object indication stage 102 is to detect a set of moving objects. The moving object indication stage 102 generally comprises a geo-registration processor 106, a short-term change detector 108, a background subtraction processor 110, an object indication processor 112, and a repository 114 of candidate objects.

The track association stage 104 associates the moving objects identified by the moving object indication stage 102 with existing tracks. The track association stage 104 generally comprises a road network repository 116, a vehicle behavior monitoring processor 118, a graph matching processor 120, a repository 122 of existing tracks, and a track updating processor 124.

The geo-registration processor 106 receives a series of input video frames from a wide field-of-view aerial sensor system, as well as a geo-reference image. The input frames and/or the geo-reference image are optionally pre-processed to correct the images (e.g., for contrast enhancement, noise reduction, non-uniform correction, lens distortion correction, or the like) before being forwarded to the geo-registration processor. The pre-processing may be performed by the wide field-of-view aerial sensors or by a dedicated pre-processor 126. The geo-registration processor 106 then processes the input frames and the geo-reference image in accordance with a geo-registration technique that stabilizes the imagery in the input frames. This geo-registration technique also ortho-rectifies the input frames into geo-coordinates, which are directly correlated with a geographic information system (GIS) database 128 for road network extraction, discussed in further detail below. In one embodiment, the input frames may be further partitioned into sub-frames or tiles (which may or may not overlap). These tiles are individually processed, and multiple tiles may be processed in parallel to speed detection and tracking.

The short-term change detector 108 receives the stabilized input frames from the geo-registration processor 106 and initializes tracking by identifying fast-moving objects depicted in the stabilized input frames. In one embodiment, moving objects are identified by performing frame subtraction using at least three of the stabilized input frames. This technique helps to initialize tracks by reducing false detections due to parallax, illumination change, and image noise.

Figure 2:
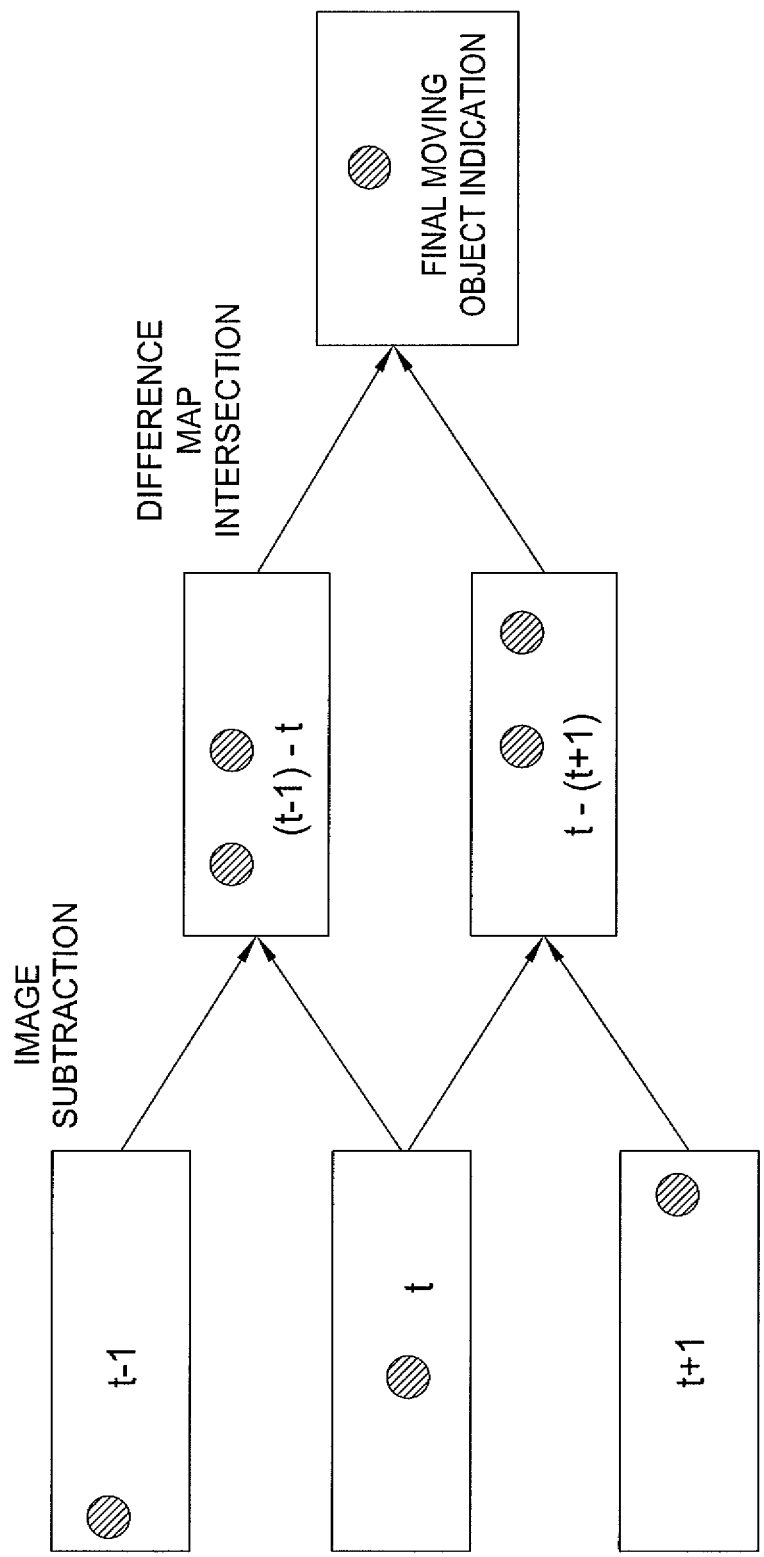
FIG. 2, for example, is a diagram illustrating an exemplary frame subtraction scheme suitable for implementation by the short-term change detector of FIG. 1.

FIG. 2, for example, is a diagram illustrating an exemplary frame subtraction scheme suitable for implementation by the short-term change detector 108 of FIG. 1. In particular, FIG. 2 illustrates a three-frame subtraction method using the frames (t−1), t, and (t+1). As illustrated, the first step of the frame subtraction scheme involves an image subtraction that computes the differences between each pair of consecutive frames, that is, [(t−1)−t] and [t−(t+1)]. The next step involves a union operation performed on the differences computed in the first step, which produces a final moving object indication. The final moving object indication typically produces a tight bounding box around an object (e.g., vehicle) depicted in the frames when the object is moving quickly or when the frame rate of the input video is low. Since wide field-of-view aerial videos tend to have low frame rates and low spatial resolutions, the vehicles depicted in the videos move relatively fast and usually do not have overlaps for the same vehicle between consecutive frames.

Referring back to FIG. 1, the long term change detector 110 also receives the stabilized input frames from the geo-registration processor 106. The long-term change detector 110 initializes tracking by identifying slow-moving or stopped objects. In one embodiment, moving objects are identified by performing background modeling and subtraction using a plurality of the stabilized input frames. The background modeling and subtraction produces a background model that, as discussed above, helps to detect slow moving and stopped objects. The background model also helps generate more candidate objects and to detect changes to static backgrounds.

The repository 114 of candidate objects receives from the short-term change detector 108 one or more candidate objects (i.e., potential subjects for tracking). As discussed above, these candidate objects are fast-moving objects depicted in the stabilized input frames.

The object indication processor 112 also receives the candidate objects from the short-term change detector. In addition, the object indication processor receives information regarding slow moving and stopped objects from the long-term change detector 110. The object indication processor 112 is a tracking-based object indicator that identifies even more candidate objects for track association. In particular, when tracked vehicles slow down or come to a full stop, the short-term change detector 108 will no longer produce motion information for these vehicles. Although the long-term change detector 110 can detect slow moving and stopped objects, it may also be susceptible to false alarms due to stabilization noise and three-dimensional parallax. The object indication processor 112 thus combines information from the short-term change detector 108 and the long-term change detector 110.

In one embodiment, the object indication processor 112 also refines the object location by maximizing the correlation score on a joint domain of an appearance, shape, movement behavior, and difference map. In one embodiment, for each track, two updated image "patches" surrounding the tracked object are maintained: (1) an appearance patch, $\delta_a$, which contains accumulated gray-level appearance information (or alternatively any accumulated appearance information, such as color, gray-scale, texture, and shape, among others); and (2) a shape patch, $\delta_s$, which contains a soft object mask. Given a new input frame $I_t$, the neighborhood area around the predicted location $x_0$ is searched to maximize the joint likelihood, such that:

$$x^* = \operatorname*{argmin}_{x \in \Omega(x_0)} P_s(x \mid D_s, D_b, \delta_s) P_a(x \mid I_t, \delta_a) P_v(x \mid I_t) \qquad \text{(EQN. 1)}$$

where $\Omega(x_0)$ is an n×n searching area centered at $x_0$. $P_s(x|D_s, D_b, \delta_s)$ is a shape matching probability term given three-frame subtraction difference map $D_s$, background difference map $D_b$, and shape patch $\delta_s$. $P_a(x|I_t, \delta_a)$ is an appearance matching probability term given input frame $I_t$ and appearance patch $\delta_a$. $P_v(x|I_t)$ is vehicle filter probability term, discussed in greater detail below. In one embodiment, instead of selecting the single best location, the top m locations around the location $x_0$ are selected as candidate objects and added to a detected object list for track association in accordance with the track association stage 104. This effectively resolves ambiguities when multiple vehicles are visually close in the input frames.

After processing by the object indication processor 112, some false detections may still exist due to three-dimensional parallax, image noise, or frame stabilization error. In one embodiment, a shape-based vehicle filter that exploits the symmetry of vehicles is used to further reduce false detections. In some applications, the original image resolution of a wide field-of-view aerial sensor system is approximately 0.5 m ground sampling distance per pixel (GSD). To maintain this exemplary resolution with a uniform scale, the geo-registration process re-scales the input frames into a 0.5 m GSD ortho-rectified image. However, the present application is capable of processing images of any resolution (e.g., in terms of centimeters or meters per pixel), since any resolution can be converted to a pixel of N×N size. At the exemplary resolution, the passenger vehicles (e.g., sedans, sport utility vehicles, vans, and the like) tend to have a size of roughly 8 pixels×8 pixels and a shape that is nearly round. Application of a symmetry filter is likely to produce strong responses from vehicle-shaped objects, and these responses can be used as additional criteria to classify vehicle- and non-vehicle-shaped objects. The symmetry filter can detect small regions whose symmetry is highly radial.

In one embodiment, only one set radius range r is computed, which corresponds to half the dimension (in the x or y direction) of a common vehicle. In this case where the common vehicle is assumed to have a size of roughly 8×8, as discussed above, the value of r would thus be four. After symmetry filter, the appearance of a black vehicle in an input image would tend to be darker than average, while the appearance of a white vehicle would tend to be brighter. The response can be converted to the vehicle filter probability term $P_v(x|I_t)$, discussed above, and subsequently directly applied to EQN. 1 to make a joint contribution for object location refinement.

Referring back to FIG. 1, once the moving object indication stage 102 has identified a set of moving objects, the track association stage 104 associates the moving objects with existing tracks. Once a moving object is assigned to a track, the track model for the next round of frame detection and tracking is updated. New tracks are then initialized only from the remaining unassigned candidate objects identified by the short-term change detector 108.

As discussed above, the track association stage 104 generally comprises a road network repository 116, a vehicle behavior monitoring processor 118, a graph matching processor 120, a repository 122 of existing tracks, and a track updating processor 124.

The graph matching processor 120 receives candidate objects from the repository 114 of candidate objects and existing tracks from the repository 122 of existing tracks, and attempts to assign an existing track to each of the candidate objects. In one embodiment, the graph matching processor 120 employs a joint probabilistic relation graph matching framework in order to perform this assignment task. In one embodiment, this graph matching framework uses not only vertex matching features (e.g., color, gradient, shape, movement characteristics such as speed and acceleration, and the like), but also pairwise spatial matching features (e.g., difference measures such as distance and appearance differences between pairs of objects). The unified graph framework contains both vertex and edge matching information, which can lead to a quadratic optimal solution for the global track association, as discussed in greater detail below.

Figure 3:
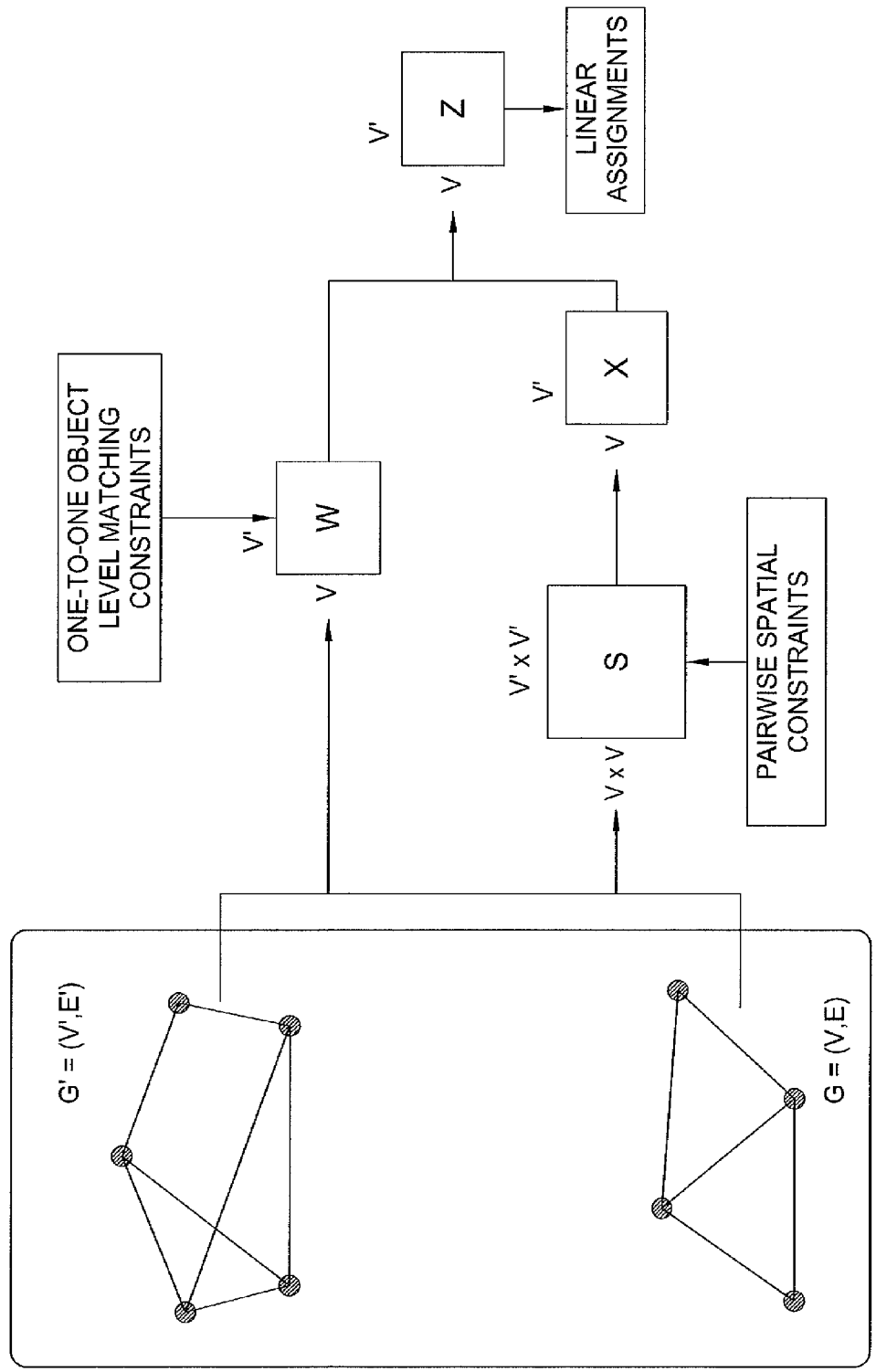
FIG. 3, for example, illustrates an exemplary joint probabilistic graph matching framework that may be employed by the graph matching processor illustrated in FIG. 1.

FIG. 3, for example, illustrates an exemplary joint probabilistic graph matching framework 300 that may be employed by the graph matching processor 120 illustrated in FIG. 1. The graph matching framework 300 generally incorporates both vertex matching features and pairwise spatial matching features, and weighs the probability of matching through matrix Z for final linear assignment.

In particular, G=(V, E) designates a plane graph, where V represents the graph vertices and E represents the edge sets between vertices. The vertices correspond to vehicles, and the edges represent the relationship between any two vehicles connected by the edges. An edge $e \in E$ is denoted as $e=(v_i, v_j)$, where $v_i, v_j \in V$. The graph G represents existing tracks in a previous input frame, and the graph G' represents candidate objects in a current input frame. A matching between G and G' results in a track to object mapping m: V→V', which also induces an edge mapping m: E→E', such that $m(e)=(m(v_i), m(v_j)) \in E'$.

The inputs to the graph matching framework 300 include two sets of matching probability terms. The first set of probability terms comprises a traditional vertex association score represented by a |V|×matrix |V'|. Each entry in W corresponds to a similarity measure between existing tracks set V and candidate object set V'. The matching probability of $W_{v,v'}$ is a joint probability that can be decomposed as the product of different feature matching scores, such that:

$$W_{v,v'}=P_k(v,v')P_s(v,v')P_a(v,v') \quad \text{(EQN. 2)}$$

where matching probability terms $P_k$, $P_s$, and $P_a$ are computed from kinematic measure, shape matching, appearance matching, respectively.

The second set of probability terms comprises pairwise spatial matching scores represented by a $|V|^2 \times |V'|^2$ edge matching matrix S, where $|V|^2$ and $|V'|^2$ are the sizes of the complete edge sets E and E', respectively. Each entry in S corresponds to a matching score between a pair of edges (e, e') from the graphs G and G', respectively. The common edge matching feature is the length of the edge, and the corresponding matching score can be derived as:

$$S_{e,e'}=\exp(-|d-d'|^2) \quad \text{(EQN. 3)}$$

where d is the length of the edge e, and d' is the length of the edge e'. Using a relative entropy measure and the algorithm described by Sinkhorn et al. in "Concerning Nonnegative Matrices and Doubly Stochastic Matrices," Pacific Journal of Mathematics, 21(2):343-348, 1967 (which is herein incorporated by reference), an optimal vertex matching solution X will be estimated directly from the matrix S, where the edge-based pairwise matching is converted into a vertex matching which inherits the spatial property implied in the edge matching scores. As a result, minimizing the edge length feature in the matrix S will maintain the distances between each pair of vehicles in the matrix X.

The optimal vertex matching solution matrix X and the object-based matrix W are joined into a single association cost matrix Z. Once the association cost matrix Z is obtained, the optimal solution can be computed by a linear solution method (e.g., the Hungarian algorithm). The resultant solution will incorporate both contributions from the pairwise spatial measures and the object level matching scores for track assignment.

Referring back to FIG. 1, once a moving object is assigned to a track by the graph matching processor 120, the track model for the next round of frame detection and tracking is updated by the track updating processor 124. This updated information is shared by the track updating processor 124 with the repository of existing tracks 122 and the object indication processor 112.

The vehicle behavior monitoring processor 118 receives road network features from the road network repository 116 (which, in turn, extracts and stores road network features from the GIS database 128). The road network features are used to inform conclusions about vehicle driving behavior, which are provided to the graph matching processor 120. Vehicle driving behavior is represented vehicle-to-vehicle interactions and vehicle-to-road interactions. In one embodiment, the relation graph framework discussed in connection with FIG. 3 is used to model vehicle behavior as a set of constraints that can regulate both vertex and edge probability terms in a graph. For example, the kinematics model may be projected as a combination of speed and road constraints (or traffic flow constraints) in order to validate the vehicle speeds and interactions between vehicles and the road. In one embodiment, the present invention employs a plurality of constraints, including one or more of: a distance constraint, a road constraint, a speed constraint, and a collision constraint.

A distance constraint is used to simulate the interactions among vehicles. When a vehicle is driven on the road, the driver must follow the traffic according to the distances and speeds of neighboring vehicles. The distance constraint affects the edges between vertices in the graph matching framework discussed above. In one embodiment, the edge matching feature d of EQN. 3 is extended into a feature vector as $\tau=[d_l \; d_s \; d_c]^t$, where $d_l$ is the distance between two vehicles, $d_s$ is the difference is speed between two vehicles, and $d_c$ is the difference in appearance (e.g., color, texture, and/or shape, among other qualities) between two vehicles. The corresponding vector-based matching score $S_{e,e'}$ can then be estimated such that:

$$S_{e,e'}=\exp(-d\tau^t \Sigma^{-1} d\tau) \quad \text{(EQN. 4)}$$

where $\Sigma$ is the covariance matrix $d\tau=\tau-\tau$. The resultant matrix S mixes the pairwise edge matching information to maintain the spatial interaction between the vehicles.

Another benefit of the distance constraint is that it reduces computation costs. Instead of computing all edge matching scores in the matrix S, the edges between vehicles that are separated by far distances (where a user may define what qualifies as a "far" distance) can be removed. If the edge number of each vertex is bounded by a small number n, then the total complexity will be reduced from $O(|V|^2 \cdot |V'|^2)$ to $O(|V| \cdot |V'| \cdot n^2)$.

A road constraint is used to regulate the traffic direction, speed, and throughput. After geo-registration, the corresponding road network is extracted from the GIS database 128. The extracted data tends to be rougher than is ideal for traffic analysis. As such, additional processing may be necessary to refine the road network data and to generate detailed traffic direction and branch information. For example, a refined road network may include two-way traffic on each road, and each intersection may be branched to allow left and right turns.

Once the road network is refined, traffic flow distribution is estimated for each location in the road network image. This flow distribution can be further enhanced by learning real traffic data, such as accumulated tracking results. Based on the traffic flow distribution, a set of constraints is generated to regulate both vertex and pairwise edge matching. For vertex matching, given a track v and a candidate object v', the probability term $W_{v,v'}$ in EQN. 2 may be re-estimated as:

$$W_{v,v'} = P_k(v,v') P_s(v,v') P_d(v,v') P_f(v,v') \quad \text{(EQN. 5)}$$

where $P_f(v,v')$ is a traffic flow term and $\propto \exp(-|\beta|)$. $\beta$ is the angle between the traffic direction and the vehicle travel direction of vertices $v \rightarrow v'$. For pairwise matching, the road network constraint works in a manner similar to the distance constraint. First, the speeds of two edge vertices $(v_i, v_j)$ are estimated, and the direction angles $\alpha_i$ and $\alpha_j$ between the vertices and traffic flow are computed. If one of the angles $\alpha_i$ or $\alpha_j$ is smaller than a predefined threshold $\sigma$, then the edge between the two vertices $v_i$ and $v_j$ is kept for pairwise matching.

A speed constraint is used to account for the inherent physical properties of a vehicle that influence vehicle driving behavior (e.g., weight, size, driving power). These properties will determine the acceleration rate, deceleration rate, and turning speed of the vehicle. One embodiment of the invention uses simulation parameters such as those commonly used in traffic simulation tools in order to obtain a better kinematic model of a vehicle. A more reasonable speed range can be estimated from the kinematic model by combining a Kalman filter with road condition (e.g., traffic flow) data. This will affect the kinematic term $P_k(v,v')$ in $W_{v,v'}$.

In one embodiment, vehicles are also grouped based on speed similarity to improve pairwise graph matching. For instance, if two vertices have similar speed directions, the edge between the vertices is kept for pairwise matching; otherwise, the edge is removed from the set of edges.

A collision constraint is used to enforce the fact that, even in dense traffic environments where numerous vehicles travel closely to one another, the vehicles cannot pass through each other (otherwise, a collision will occur). Given a vehicle assignment, the collision point between two vehicles can be identified as the intersection of the vehicles' trajectories. However, since this constraint can only be detected after vehicle association, it cannot be directly incorporated in the graph matching framework discussed above. Accordingly, in one embodiment, the collision constraint is implemented as a post-track-assignment constraint to identify collision pairs. If two vehicles meet the collision condition, the association costs of both vehicles are review, and the larger association cost is set as an occlusion case. Hence, track assignment for the corresponding vehicle is deferred to the next input frame so that more evidence can be collected to help resolve ambiguities.

Figure 4:
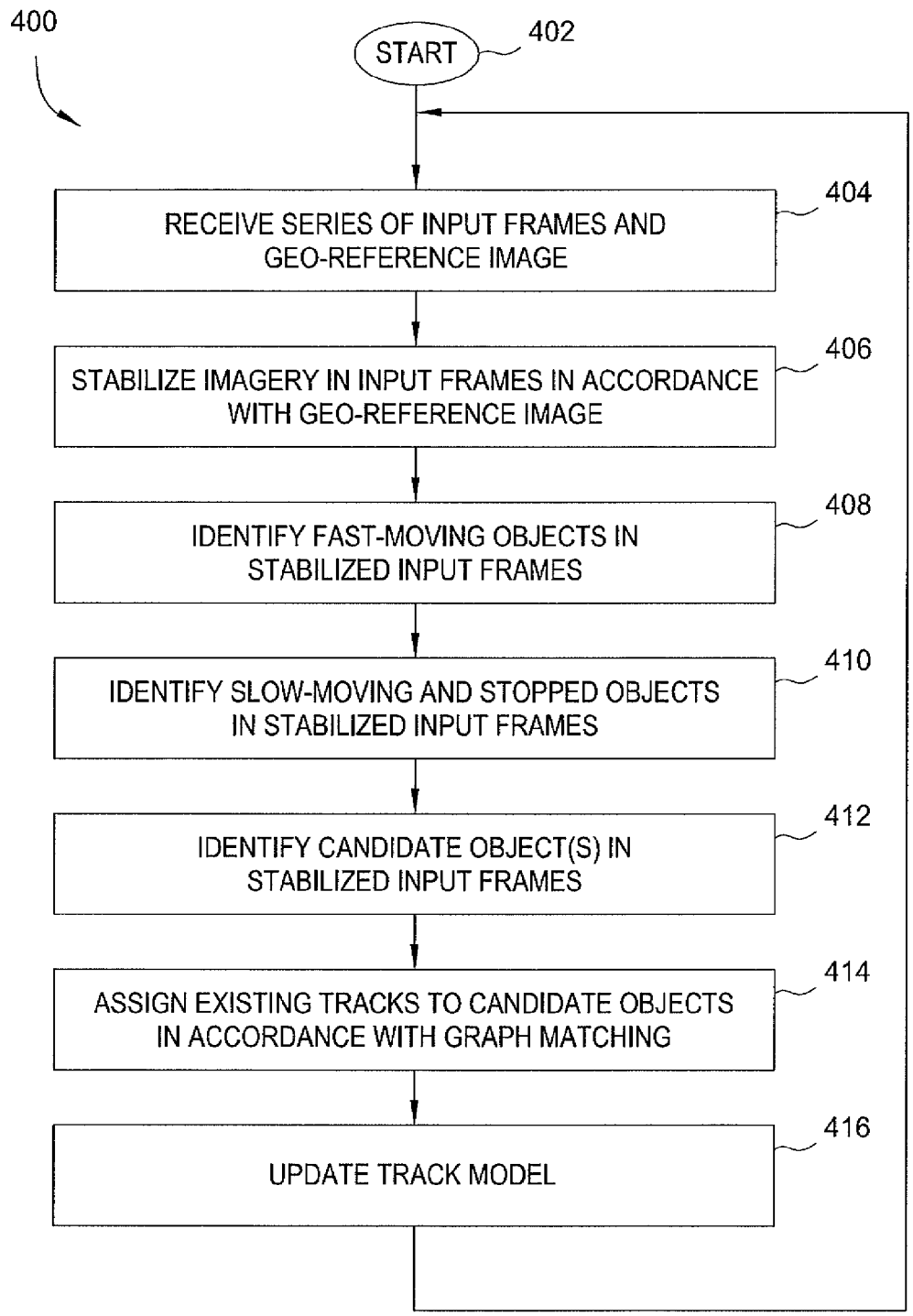
FIG. 4 is a flow diagram illustrating one embodiment of a method for detecting and tracking vehicles, according to the present invention.

FIG. 4 is a flow diagram illustrating one embodiment of a method 400 for detecting and tracking vehicles, according to the present invention. The method 400 may be implemented, for example, by the vehicle detection and tracking system 100 illustrated in FIG. 1. As such, reference is made in the discussion of the method 400 to various elements of the vehicle detection and tracking system 100. It will be appreciated, however, that the method 400 is not limited to implementation with a vehicle detection and tracking system configured exactly as illustrated in FIG. 1. That is, the method 400 may be implemented in vehicle detection and tracking systems having configurations that differ from that illustrated in FIG. 1.

The method 400 is initialized at step 402 and proceeds to step 404, where the geo-registration processor 106 receives a series of input frames from a wide field-of-view aerial sensor system and a geo-reference image. As discussed above, the input frames and/or geo-reference image may have been pre-processed prior to being received. In step 406, the geo-registration processor 106 stabilizes the imagery in the input frames, in accordance with the geo-reference image.

In step 408, the short-term change detector 108 identifies fast-moving objects in the stabilized input frames. As discussed above, this step may include a frame subtraction technique that uses at least three of the stabilized input frames.

In step 410, the long-term change detector 110 identifies slow-moving and stopped objects in the stabilized input frames. As discussed above, this step may include a background subtraction technique that uses at least three of the stabilized input frames.

In step 412, the object indication processor 112 identifies at least one candidate object in the stabilized input frames, using the information identified by the short-term change detector 108 and the long-term change detector 110. As discussed above, the candidate objects are stored in the repository 114 of candidate objects.

In step 414, the graph matching processor 120 assigns existing tracks to candidate objects in accordance with a joint probabilistic graph matching framework. As discussed above, this graph matching framework contains both vertex and edge matching information. These constraints may be informed by road network data and information about vehicle behavior, as discussed above.

In step 416, the track updating processor updates the track model for the next round of frame detection and tracking. The method 400 then returns to step 404 and receives a next series of input frames. The next series of input frames is processed as described above with respect to steps 404-416.

Figure 5:
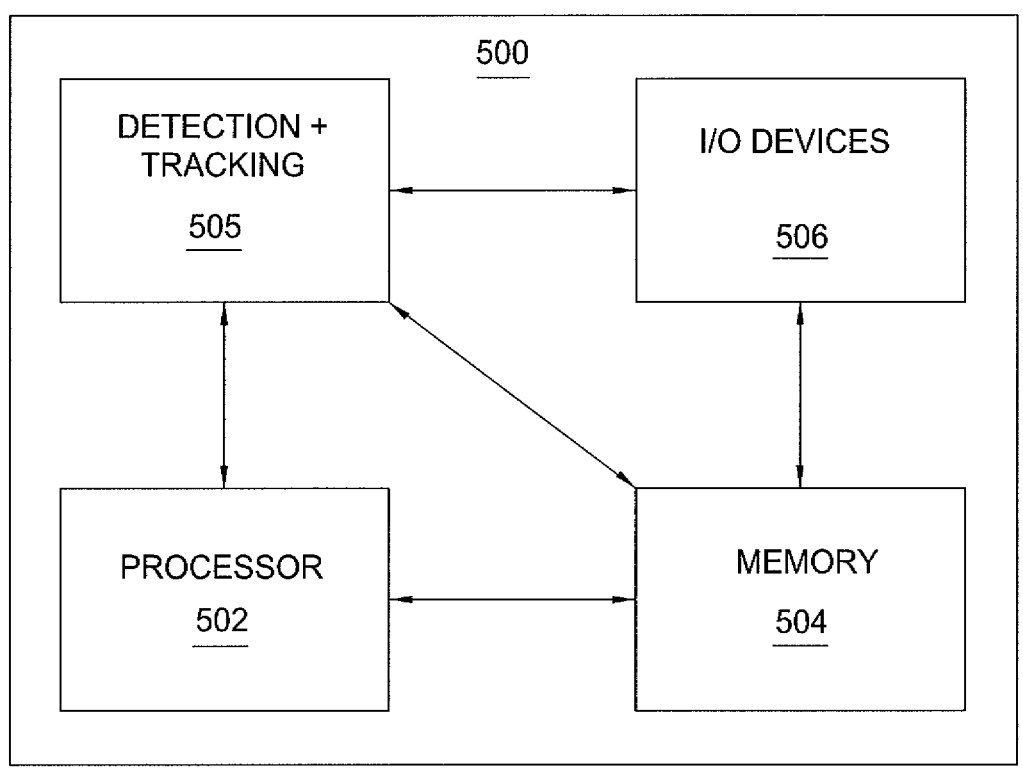
FIG. 5 is a high level block diagram of the present invention implemented using a general purpose computing device.

FIG. 5 is a high level block diagram of the present invention implemented using a general purpose computing device 500. It should be understood that embodiments of the invention can be implemented as a physical device or subsystem that is coupled to a processor through a communication channel. Therefore, in one embodiment, a general purpose computing device 500 comprises a processor 502, a memory 504, a detection and tracking module 505, and various input/output (I/O) devices 506 such as a display, a keyboard, a mouse, a modem, a microphone, speakers, a touch screen, a hybrid I/O device, and the like. In one embodiment, at least one I/O device is a storage device (e.g., a disk drive, an optical disk drive, a floppy disk drive).

Alternatively, embodiments of the present invention (e.g., detection and tracking module 505) can be represented by one or more software applications (or even a combination of software and hardware, e.g., using Application Specific Integrated Circuits (ASIC)), where the software is loaded from a storage medium (e.g., I/O devices 506) and operated by the processor 502 in the memory 504 of the general purpose computing device 500. Thus, in one embodiment, the detection and tracking module 505 for detecting and tracking vehicles described herein with reference to the preceding Figures can be stored on a non-transitory computer readable medium (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

Although various embodiments which incorporate the teachings of the present invention have been shown and described in detail herein, those skilled in the art can readily devise many other varied embodiments that still incorporate these teachings.

What is claimed is:

1. A system for detecting and tracking a moving object in a field of view, the system comprising:
    a moving object indication stage for detecting a candidate object in a series of input video frames depicting the field of view, wherein the moving object indication stage comprises:
        a short-term change detector for detecting fast-moving objects in the series of input video frames; and
        a long-term change detector for detecting slow-moving and stopped objects in the series of input video frames; and
    a track association stage that uses a joint probabilistic graph matching framework to associate an existing track with the candidate object based on analysis of a first set of matching probability terms and a different second set of matching probability terms, and wherein the existing track represents a trajectory of the candidate object, wherein the track association stage comprises:
        a repository for storing the existing track; and
        a graph matching processor for matching the candidate object to the existing track using at least one of: a vertex matching feature and a pairwise spatial matching feature.

2. A method for detecting and tracking a moving object in a field of view, the method comprising:
    detecting a candidate object in a series of input video frames depicting the field of view, wherein the detecting comprises:
        identifying one or more fast-moving objects depicted in the series of input video frames;
        identifying one or more slow-moving or stopped objects in the series of input video frames; and
        identifying the candidate object in accordance with the one or more fast-moving objects and the one or more slow-moving objects; and
    associating an existing track with the candidate object in accordance with a joint probabilistic graph matching framework based on analysis of a first set of matching probability terms and a different second set of matching probability terms, and wherein the existing track represents a trajectory of the candidate object wherein the track association stage comprises:
        a repository for storing the existing track; and
        a graph matching processor for matching the candidate object to the existing track using at least one of: a vertex matching feature and a pairwise spatial matching feature.

3. The method of claim 2, wherein the identifying the one or more fast-moving objects comprises:
    performing frame subtraction using at least three frames from the series of input video frames, thereby producing a bounding shape around the candidate object.

4. The method of claim 2, wherein the identifying the one or more slow-moving or stopped objects comprises:
    performing background modeling and subtraction using a plurality of frames from the series of input video frames, thereby producing a background model.

5. The method of claim 2, wherein the identifying the candidate object comprises:
    refining a predicted location of the candidate object as estimated in accordance with the identifying one or more fast-moving objects and the identifying the one or more slow-moving or stopped objects, wherein the refining maximizes a correlation score on a joint domain of an appearance of the candidate object, a shape of the candidate object, a movement behavior of the candidate object, and a difference map.

6. The method of claim 5, wherein the refining comprises:
    maintaining an appearance patch surrounding the candidate object in the existing track, the appearance patch containing accumulated appearance information for the candidate object; and
    maintaining a shape patch surrounding the candidate object in the existing track, the shape patch containing a soft object mask for the candidate object; and
    selecting a number of locations around the predicted location, wherein the number of locations comprises a fixed number of locations that best maximize the correlation score.

7. The method of claim 6, wherein each location in the number of locations is added as a new candidate object to be tracked.

8. The method of claim 2, wherein the associating comprises:
    obtaining a first graph that represents a set of existing tracks including the existing track in a previous frame of the series of input video frames;
    obtaining a second graph that represents a set of candidate objects including the candidate object in a current frame of the series of input video frames; and
    producing a plurality of mappings between the first graph and the second graph.

9. The method of claim 8, wherein the plurality of mappings comprises:
    a first mapping that maps the existing track in the first graph to the candidate object in the second graph.

10. The method of claim 9, wherein the producing comprises:
    matching the candidate object to the existing track using at least one vertex matching feature included in the first set of probability matching terms and at least one pairwise spatial matching feature included in the second set of probability matching terms.

11. The method of claim 10, wherein the at least one vertex matching feature comprises at least one of: color, gradient, shape, or movement characteristic.

12. The method of claim 10, wherein the at least one pairwise spatial matching feature is a measure of difference between the candidate object and a object indicated by the existing track.

13. The method of claim 12, wherein the at least one pairwise spatial matching feature comprises at least one of: a distance between the candidate object and the object indicated by the existing track or a difference in appearance between the candidate object and the object indicated by the existing track.

14. The method of claim 2, further comprising:
updating a track model for use in detecting a new candidate object in a new series of input video frames, wherein the updating is responsive to the associating.

15. The method of claim 2, wherein a behavior of the candidate object is modeled as a set of constraints that regulate edge probability and vertex probability in the joint probabilistic graph matching framework.

16. The method of claim 15, wherein the set of constraints comprises at least one of: a distance constraint, a road constraint, a speed constraint, or a collision constraint.

17. A non-transitory computer readable storage device containing an executable program for detecting and tracking a moving object in a field of view, where the program performs steps comprising:
detecting a candidate object in a series of input video frames depicting the field of view, wherein the detecting comprises:
identifying one or more fast-moving objects depicted in the series of input video frames;
identifying one or more slow-moving or stopped objects in the series of input video frames; and
identifying the candidate object in accordance with the one or more fast-moving objects and the one or more slow-moving objects; and
associating an existing track with the candidate object in accordance with a joint probabilistic graph matching framework based on analysis of a first set of matching probability terms and a different second set of matching probability terms, and wherein the existing track represents a trajectory of the candidate object, wherein the track association stage comprises:
a repository for storing the existing track; and
a graph matching processor for matching the candidate object to the existing track using at least one of: a vertex matching feature and a pairwise spatial matching feature.

18. The system of claim 1, wherein the candidate object is the moving object.

19. The method of claim 2, wherein the candidate object is the moving object.

* * * * *